US012616919B2

(12) United States Patent
Townsend et al.

(10) Patent No.: US 12,616,919 B2
(45) Date of Patent: May 5, 2026

(54) OPTIMIZING THE OPERATION OF A CHROMATOGRAPHY SYSTEM

(71) Applicant: Cytiva Sweden AB, Uppsala (SE)

(72) Inventors: Matthew Townsend, Hertfordshire (GB); Ian Scanlon, Hertfordshire (GB)

(73) Assignee: Cytiva Sweden AB, Uppsala (SE)

( * ) Notice: Subject to any disclaimer, the term of this patent is extended or adjusted under 35 U.S.C. 154(b) by 496 days.

(21) Appl. No.: 17/431,219

(22) PCT Filed: Feb. 24, 2020

(86) PCT No.: PCT/EP2020/054748
§ 371 (c)(1),
(2) Date: Aug. 16, 2021

(87) PCT Pub. No.: WO2020/173862
PCT Pub. Date: Sep. 3, 2020

(65) Prior Publication Data
US 2022/0111309 A1      Apr. 14, 2022

(30) Foreign Application Priority Data
Feb. 28, 2019    (GB) ..................................... 1902743

(51) Int. Cl.
*B01D 15/18*          (2006.01)
*B01D 15/12*          (2006.01)
(Continued)

(52) U.S. Cl.
CPC ....... *B01D 15/1864* (2013.01); *B01D 15/125* (2013.01); *B01D 15/34* (2013.01); *B01D 15/3809* (2013.01)

(58) Field of Classification Search
None
See application file for complete search history.

(56) References Cited

U.S. PATENT DOCUMENTS 8,186,381 B2 * 5/2012 Wilen ................... F16K 11/074
137/625.11
9,802,979 B2 * 10/2017 Bracewell ................ C07K 1/22
(Continued)

FOREIGN PATENT DOCUMENTS

CN        204073503 U     1/2015
CN        107923887 A     4/2018
(Continued)

OTHER PUBLICATIONS

Office Action and Search Report Issued in Chinese Patent Application No. 202080017428.0, mailed Aug. 24, 2022 with English Translation. (19 pages).
(Continued)

*Primary Examiner* — Benjamin M Kurtz
(74) *Attorney, Agent, or Firm* — Eversheds-Sutherland (US) LLP

(57) ABSTRACT

The present invention relates to a method for purifying a feed comprising at least one target product in a chromatography system having a plurality of purifying units, each having an inlet and an outlet, and a valve assembly having an outlet port and an inlet port. The inlet and the outlet of each purifying unit being connected to a respective port of the valve assembly. The method comprising loading (S10) the plurality of purifying units with feed provided through the inlet port of the valve assembly by sequentially connecting each purifying unit to the inlet port of the valve assembly: eluting (S12) the plurality of purifying units using an elution provided through the inlet port of the valve assembly by sequentially connecting each purifying unit to the inlet port of the valve assembly: and collecting (S14) the at least one target product from the outlet port of the valve.

10 Claims, 8 Drawing Sheets

(51) Int. Cl.
   *B01D 15/34* (2006.01)
   *B01D 15/38* (2006.01)

(56) References Cited

U.S. PATENT DOCUMENTS

| | | | |
|---|---|---|---|
| 11,047,834 B2 | 6/2021 | Yamazaki | |
| 2009/0314716 A1 | 12/2009 | Osaka | |
| 2016/0136543 A1* | 5/2016 | Shibuya | B01D 15/1885 |
| | | | 210/198.2 |
| 2020/0001203 A1* | 1/2020 | Sichting | B01D 15/203 |

FOREIGN PATENT DOCUMENTS

| | | | |
|---|---|---|---|
| CN | 110536732 A | 12/2019 | |
| EP | 3343217 A1 | 7/2018 | |
| JP | 2015-515633 A | 5/2015 | |
| JP | 2016-534373 A | 11/2016 | |
| JP | WO2017/033256 A1 | 4/2018 | |
| WO | 00/64557 A1 | 11/2000 | |
| WO | 2008127087 A1 | 10/2008 | |
| WO | 2008153472 A1 | 12/2008 | |
| WO | 2013068741 A1 | 5/2013 | |
| WO | 2013/134483 A1 | 9/2013 | |
| WO | 2013162449 A1 | 10/2013 | |
| WO | 2015052465 A1 | 4/2015 | |
| WO | 2015/094096 A1 | 6/2015 | |
| WO | 2018/153776 A1 | 8/2018 | |

OTHER PUBLICATIONS

PCT International Search Report and Written Opinion for PCT/EP2020/054748 mailed May 27, 2020 (9 pages).

Great Britain Search Report for GB Application No. 1902743.2 mailed Aug. 13, 2019 (4 pages).

European Office Action for EP Application No. 20706506.1, mailed May 6, 2024 (5 pages).

Japanese Office Action for JP Application No. 2021-550259, mailed Dec. 11, 2023 (7 pages, English translation).

Japanese Office Action for JP Application No. 2021-550259, mailed Mar. 25, 2024 (4 pages).

* cited by examiner

OPTIMIZING THE OPERATION OF A CHROMATOGRAPHY SYSTEM

CROSS REFERENCE TO RELATED APPLICATIONS

This application claims the priority benefit of PCT/EP2020/054748, filed on Feb. 24, 2020, which claims the benefit of Great Britain Application No. 1902743.2, filed 28 Feb. 2019, the entire contents of which are incorporated by reference herein.

FIELD OF THE INVENTION

The present invention relates to optimizing operation of a chromatography system using a valve assembly for purifying a feed comprising at least one target product in a chromatography system having a plurality of purifying units.

BACKGROUND OF THE INVENTION

Physical separation methods in which the material separation occurs through distribution between a stationary phase and a mobile phase are known by the term chromatography. Examples of such chromatography methods are gel-permeation chromatography (GPC), adsorption chromatography, affinity chromatography, ion-exchange chromatography and hydrophobic interaction chromatography.

In gel-permeation chromatography, the separation columns are usually filled with beads of a porous, highly cross-linked material. Conducted through this material is a fluid which comprises substances of differing molecular size. Substances of smaller molecular size, i.e. having a smaller hydrodynamic volume, diffuse into the solvent interface or into the pores of the gel and remain there until they diffuse back out of the solvent interface or the pores. The fractionation occurs because the larger molecules are exclude from part of the pore volume, i.e. spend less time in the stagnate volume inside the pores. Large solutes elute first.

Gel-permeation chromatography is therefore a separation method which is commonly used both in chemical and in pharmaceutical development and production, more particularly for the isolation of biomolecules from complex mixtures which, for example, arise during the production of proteins in microorganisms or during the isolation of individual constituents from biological fluids, such as blood.

In (membrane) adsorption chromatography, in contrast to gel-permeation chromatography, there is binding of components of a fluid, for example individual molecules, associates or particles, to the surface of a solid in contact with the fluid.

A solid capable of adsorption is called an "adsorbent", and the component to be adsorbed is called an "adsorbate". Adsorption can be used industrially for adsorptive material separation, which is carried out in apparatuses called "adsorbers". The adsorbate is referred to as a "target product" when its recovery from the fluid is intended, and as a "impurity" when it is to be removed from said fluid. In the first case, the adsorption has to be reversible, and the adsorption is followed, as a second step of the method, under modified conditions (composition and/or temperature) of the fluid, by the elution of the adsorbate. A target substance can be present as a single component in the fluid, and so the material separation is merely an enrichment, or there are multiple components which are to be separated. In this case, at least one of the steps of the method has to be selective, i.e. has to be achieved to different extents for the components to be separated.

An example of a membrane adsorption material is described in WO 2018/037244, which is hereby incorporated by reference. U.S. Pat. No. 9,802,979, US2016/0288089, WO2018/0372444 and WO2018/011600 which are incorporated by reference, describes chromatography medium comprising one or more electrospun polymer nanofibres which form a stationary phase. Another example is Sartobind®, available from Sartorius.

In a conventional liquid Chromatography system, such as the ÄKTA™ pure system (29-0211-96 AE) from GE Healthcare, valves are used in order to switch between the different modes of operation: load, wash and elute. When switching between modes of operation, valves and piping may contain residues from the previous step, which requires cleaning and increased usage of buffer solution.

SUMMARY OF THE INVENTION

An object of the invention is to provide an improved process to eliminate or at least reduce the above identified drawbacks.

This object is achieved by a method for purifying a feed comprising at least one target product in a chromatography system having a plurality of purifying units, each purifying unit having an inlet and an outlet, and a valve assembly (40; 12) having an outlet port and an inlet port. The inlet and the outlet of each purifying unit is connected to a respective port of the valve assembly. The method comprises: loading the plurality of purifying units with feed provided through the inlet port of the valve assembly by sequentially connecting each purifying unit to the inlet port of the valve assembly; when loading is completed for all purifying units, eluting the plurality of purifying units using a solution to elute provided through the inlet port of the valve assembly by sequentially connecting each purifying unit to the inlet port of the valve assembly; and collecting the at least one target product from the outlet port of the valve assembly. Herein, 'sequentially connecting' means connecting in a sequence, for example one unit after another, or two (or plural) units, and then another two (or the plural) units.

An advantage with the invention is an increased productivity and reduced buffer usage in a liquid chromatography system.

DETAILED DESCRIPTION OF THE INVENTION

The present invention is applicable to different types of chromatography systems employing multiple purifying units. As mentioned above, examples of chromatography methods are gel-permeation chromatography (GPC) and adsorptive chromatography (such as adsorption chromatography, affinity chromatography, ion-exchange chromatography and hydrophobic interaction chromatography). Different modalities may be used and all types could be present in both resin based and membrane based purifying units. Furthermore, the invention works both for "bind-Elute" separation as well as "Flow through" separation as mentioned below.

The concept may be used for different types of purifying units/columns comprising standard resin, such as MabSelect protein A resin; or high flow rate material, such as cellulosic fibres functionalized with protein A ligand. FIBRO PrismA is an example of a high flow rate material and in FIG. 9, the effect of residence time on binding capacity is compared between a standard resin Mabselect PrismA and FIBRO PrismA.

Figure 8:
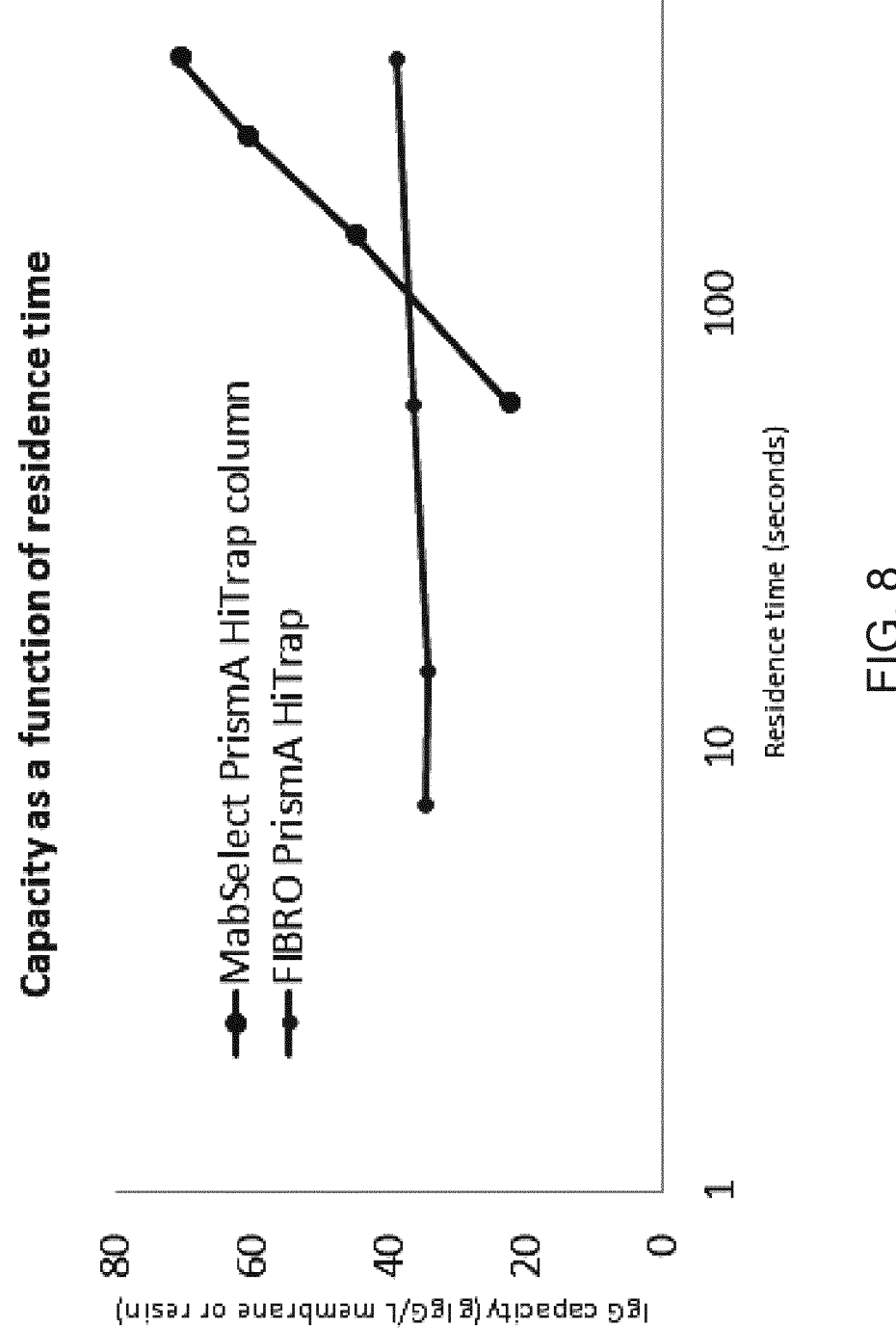
FIG. 8 illustrates the capacity as a function of residence time for standard resin compared with cellulosic fibre material.

FIBRO is a high productivity Protein A chromatography technology giving reduced lead time in process development, reduced Protein A costs in clinical manufacturing and enabling single-use in capture chromatography for flexible manufacturing opportunities. The technology is a protein A chromatography device combining flow rates of membranes with capacity of chromatography resins, and has a fibre structure that provides a high surface area (high capacity) and high macro-porosity (high flow rate). The convective mass transport results in binding capacities more or less independent of residence time. This is illustrated in FIG. 8.

Below is a list of chromatography modalities that may be used in the present invention:

Affinity chromatography, including but not limited to protein-protein interaction affinity ligands (e.g. Protein A), Protein fragment/peptide-protein interaction affinity for example the AVB ligand for viral purification, Immobilized metal affinity chromatography (IMAC) nickel-His tag, lectin, etc.

Ion exchange chromatography, including anion exchange (AEX) and cation exchange (CEX), both weak and strong IEX; examples include Capto S ImpAct, etc.

Hydrophobic interaction chromatography (HIC), ligands are diverse and made up of various hydrophobic group ranging from methyl, ethyl, propyl, octyl, phenyl, butyl etc.

Mixed Mode chromatography; a combination of two or more of the above modalities; for example dye ligands or Capto MMC.

A key aspect of the invention is a valve assembly that will allow a plurality of purifying units, such as one or more chromatography columns connected in series or parallel in a chromatography system, to be sequentially connected to an inlet port of the valve assembly for efficient purification of a feed comprising at least one target product. A first example of a valve assembly 40 together with three purifying units, denoted 1-3, is described in FIG. 2b. The valve assembly is configured connect each purifying unit to an inlet port and an outlet port of the valve assembly one at a time. Media, such as feed, buffer (solution), etc., enters through the inlet port and flows in the direction of the arrows through the purifying units 1, 2 and 3 to the respective unit outlet ports, and the valve is arranged to sequentially the purifying units one at a time. The process flow is described in more detail in connection with FIG. 5.

Figure 2A:
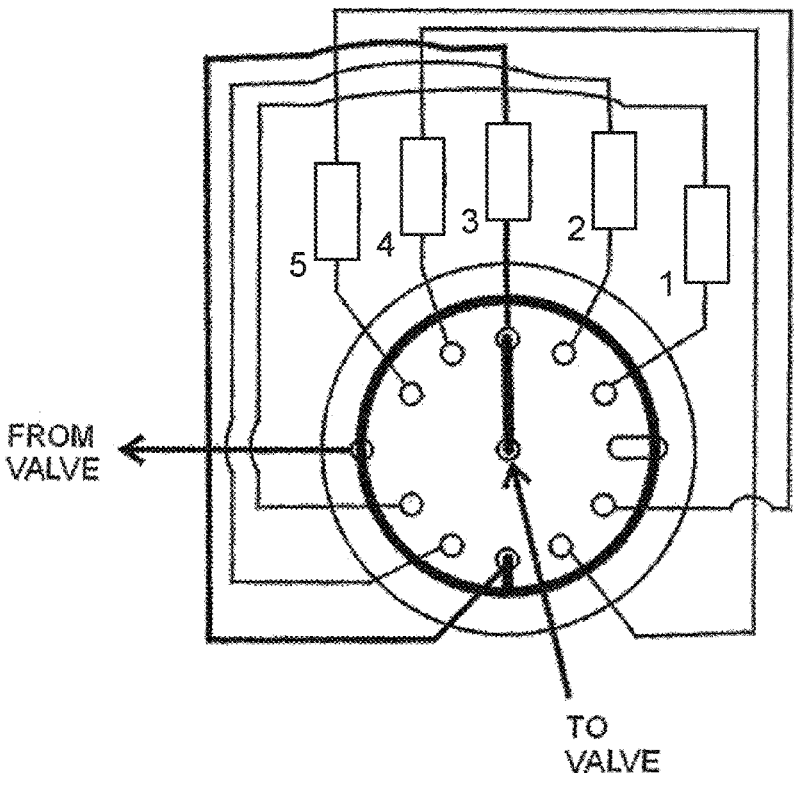
FIG. 2a is a schematic view of five components connected to a valve.
Figure 2B:
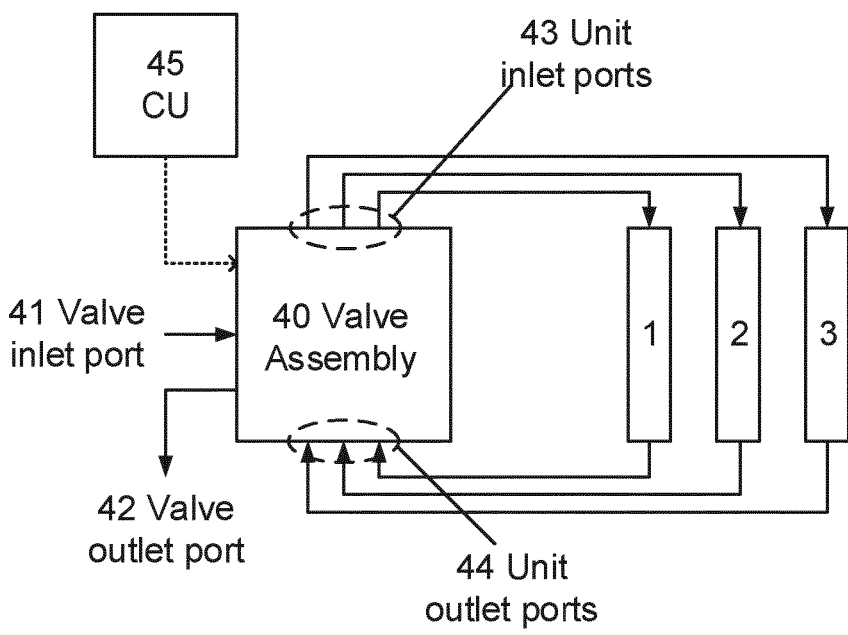
FIG. 2b is a schematic view of a first example of a valve assembly connected to three purifying units.

FIG. 2b discloses a part of a chromatography system for purifying a feed having a plurality of purifying units. Each purifying unit having an inlet and an outlet, and a valve assembly 40 having an outlet port 42 and an inlet port 41, wherein the inlet and the outlet of each purifying unit is connected to a respective port 43, 44 of the valve assembly 40. The system further comprises a control unit 45 configured to control the valve assembly 40 in order to sequentially connect the inlet port 43 of each purifying unit to the valve inlet port 41 and the outlet port 44 of the same purifying unit to the valve outlet port 42.

Figure 2C:
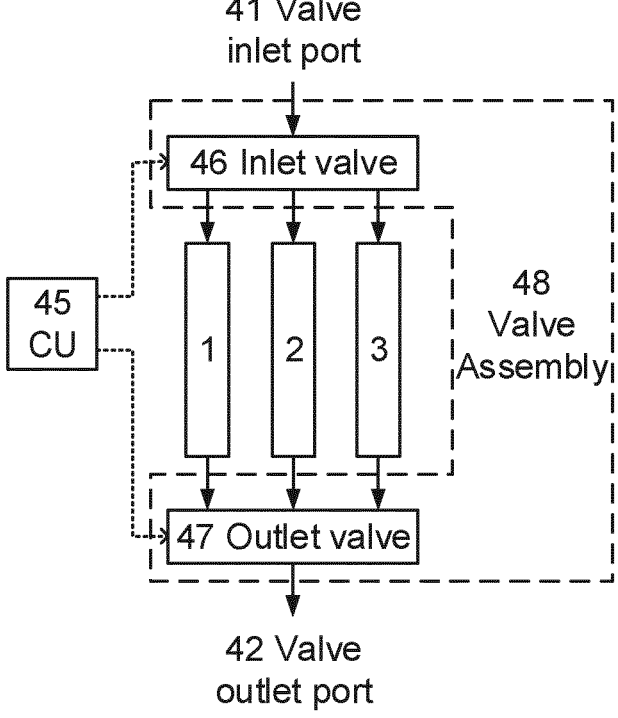
FIG. 2c is a schematic view of a second example of a valve assembly connected to three purifying units.

FIG. 2c illustrate a second example of a valve assembly 48 (illustrated by dashed lines) having a separate inlet valve 46 and a separate outlet valve 47. The inlet valve 46 and the outlet valve 47 are controlled by a control unit 45 which is configured to sequentially connect the inlet port of each purifying unit to the valve inlet port 41 and the outlet port of the same purifying unit to the valve outlet port 42.

The valve assembly may comprise a single rotary valve (as disclosed in connection with FIG. 2a) or a plurality of valves configured to sequentially connect the purifying units (as disclosed in connection with FIG. 2c). The valve assembly may comprise other relevant types of valves, e.g. membrane valves, pinch valves etc.

Valves are commonly used in devices that involve the transportation of a fluid. A typical type of valve, for example used in laboratory systems of moderate sizes such as a liquid chromatography system (LCS), is the rotary valve.

Generally, a rotary valve has a stationary body, herein called a stator, which co-operates with a rotating body, herein called a rotor.

The stator is provided with a number of inlet and outlet ports. The ports are via bores in fluid communication with a corresponding set of orifices on an inner stator face. The inner stator face is an inner surface of the stator that is in fluid tight contact with an inner rotor face of the rotor. The rotor is typically formed as a disc and the inner rotor face is pressed against the inner stator face in rotating co-operation. The inner rotor face is provided with one or more grooves which interconnect different orifices depending on the rotary position of the rotor with respect to the stator.

Rotary valves can be designed to withstand high pressures (such as pressures above 30 MPa). They can be made from a range of materials, such as stainless steel, high performance polymeric materials and ceramics.

The number of inlets/outlets as well as the design of grooves in the rotator or the stator reflects the intended use of a specific valve.

Figure 1:
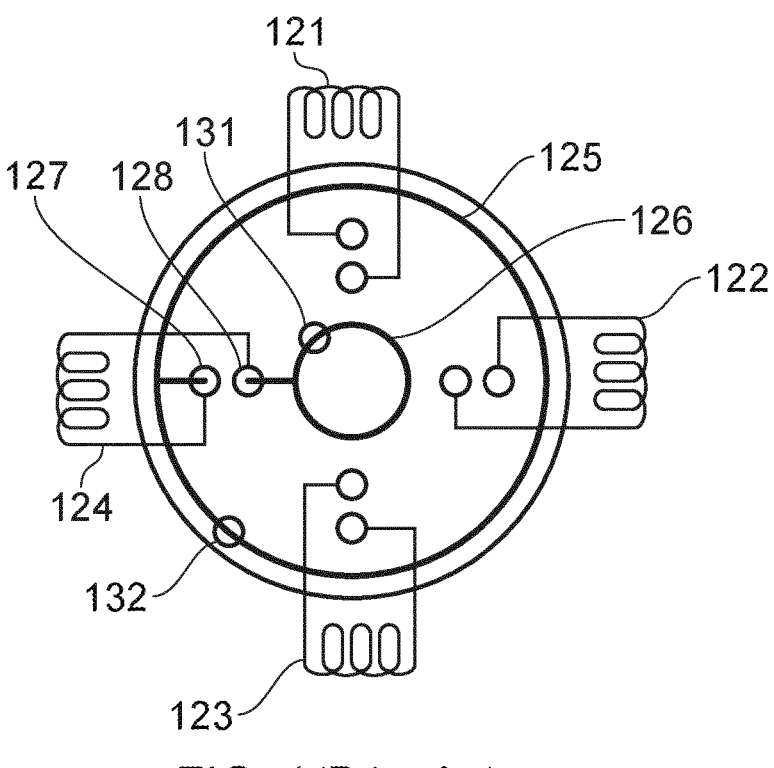
FIG. 1 is a schematic view of a prior art selection valve.

An example of a multi purpose valve is the 6-port ST valve available from Valco Instruments Co. Inc., which is illustrated in FIG. 1.

Four components 121-124, herein illustrated as capillary loops, may be connected to the stator of the valve. The valve stator also has an inlet port 132 and an outlet port 131. The valve rotor has two grooves 125, 126. The outer groove 125, that is in fluid communication with the inlet port 132, has an inwardly radially extending portion that connects to one end 127 of the selected component 124. At the same time, the inner groove 126, that is in fluid communication with the outlet port 131, has an outwardly radially extending portion that connects to the other end 128 of the selected component 124.

Thus, the user may pass a flow through the selected component while the other components are isolated from the valve inlet/outlet. Provided that the flow direction through the valve is always the same, the flow direction through each component is determined by how it is connected to the valve.

However, sometimes the user wishes to alternate the flow direction through the component. For example, in the case that the component is a chromatography column it is sometimes desirable to load the column in one direction and then eluate the trapped content using a reversed flow direction. With a prior art valve similar to the one described above, it is then necessary to redirect the flow using additional means, such as a flow redirecting valve.

An example of another multi purpose vale is described in connection with FIG. 2, also disclosed in U.S. Pat. No. 8,186,381 which is hereby incorporated by reference. FIG. 2 illustrates how five purifying units 1-5 (for instance capillary loops or chromatography columns) are connected to a rotary valve. In this case, the valve rotor is shown in a position wherein the third component 3 is selected.

Figure 3:
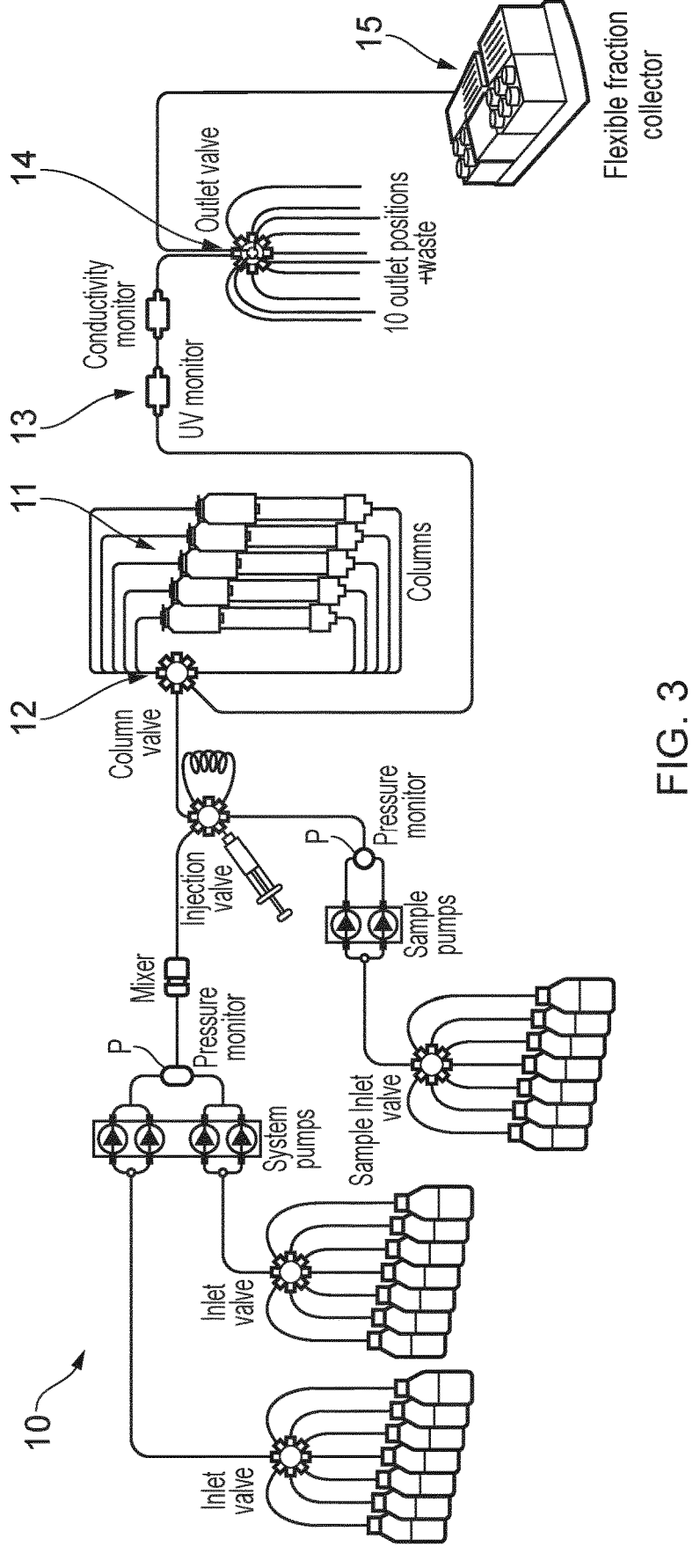
FIG. 3 illustrates a liquid chromatography system with multiple columns (in this example five columns)

FIG. 3 illustrates a liquid chromatography system 10 with multiple purifying units 11 (here implemented as columns and in this example five columns). A valve assembly (here illustrated as a single column valve 12) is used to alternatively select column and/or bypass the columns The column valve may be implemented as a rotary valve as disclosed in U.S. Pat. No. 8,186,381. A UV detector 13 is positioned downstream of the columns before an outlet valve 14 selects if liquid that passes through the UV detector should be collected in a fraction collector 15 or if the liquid should be removed as waste. a pH meter (not shown) may be implemented in series with the UV detector.

Figure 4:
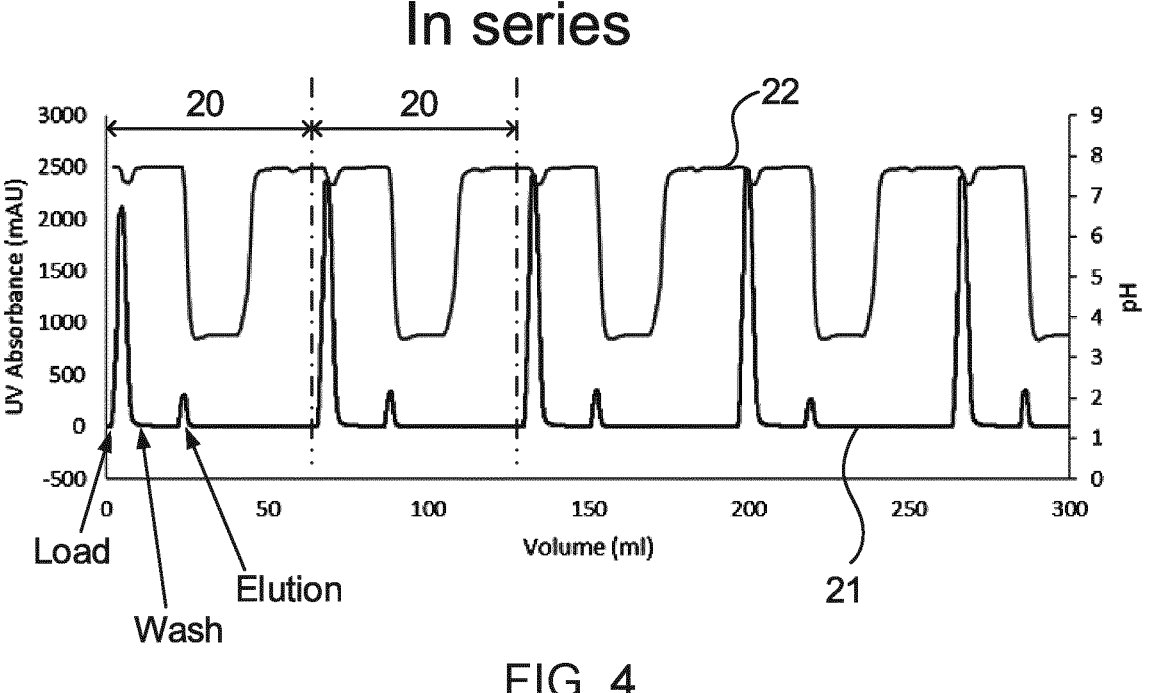
FIG. 4 illustrates chromatography runs in series.

During operation the columns 11 may be operated in series, i.e. each column is subject to a run comprising: load, wash and elution, before switching to the next column. This is illustrated in FIG. 4 that shows chromatography runs in series. Curve 21 illustrates an UV signal and curve 22 a pH signal for several chromatography runs as a function of volume (ml), each run is indicated by 20. In this example, more than 300 ml passes through the UV detector 13 and pH meter to use the full capacity of all columns.

The main reason for using that amount of liquid is related to cleaning of valves when switching between different stages of the chromatography run. The dead volume in valves and pipes increases the amount of buffer (or solution) that is required to secure proper operations.

The used volume is indicated on the x axis in FIG. 4 and each run 20 is equal to approximately 67 ml, which means that five runs amounts to 335 ml.

In order to reduce the dead volume in the system of FIG. 3, the valve switching is modified to operate the columns in a semi-continuous run as described below.

Figure 5:
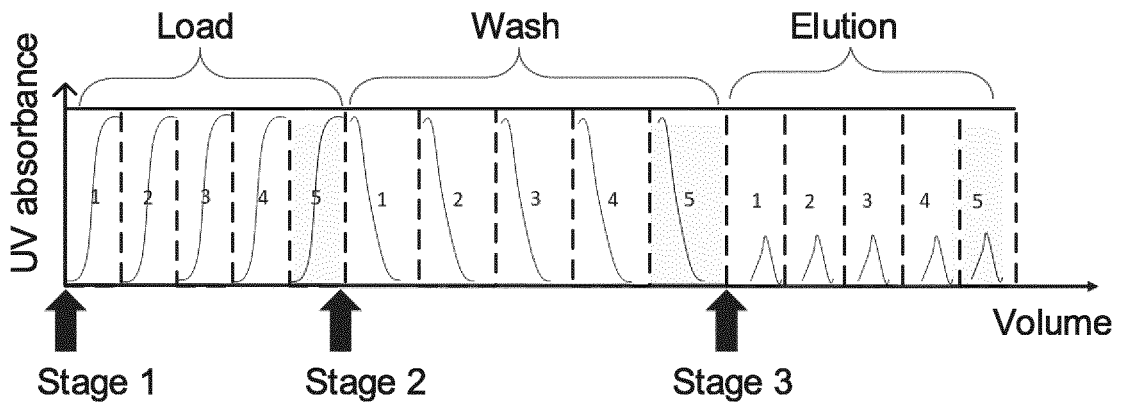
FIG. 5 schematically illustrates a five column semi-continuous run.

FIG. 5 schematically illustrates the concept using a five purifying units. Each purifying unit is indicated by numerals 1, 2, 3, 4 and 5 and during "stage 1" each purifying unit is loaded sequentially, and at "stage 2" each purifying unit is washed sequentially and at "stage 3" each purifying unit is eluted sequentially to be collected. This generated a semi-continuous run which reduces the number of valve switching and thereby reduces the amount of solution used, as well as it reduces the run time.

The use of membrane adsorbers, for instance cellulosic material, enables users to run capture step much faster, or use a purifying unit which is much smaller volume compared to packed bed columns with resin. In a system, as described in connection with FIG. 3, a small volume protein A purifying unit (20-50 fold reduction compared to packed bed) is used and cycled up to 200 times to purify a bioreactor during a working day. Using membrane adsorbers, each purification cycle is approximately 5 minutes compared to conventional chromatography with cycle times of 2-6 hours.

Figure 6:
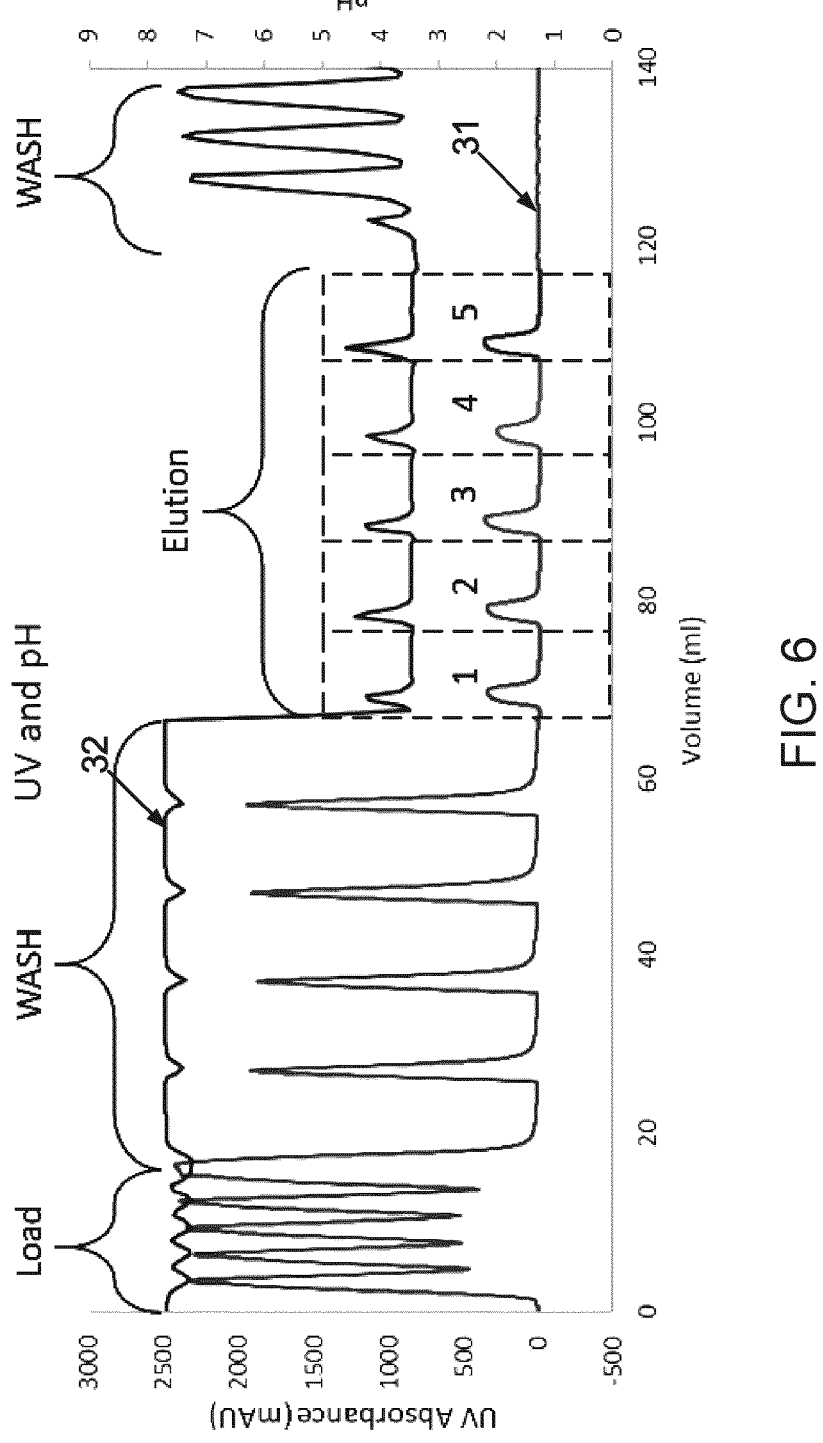
FIGS. 6 and 7 illustrate UV, pH and pressure as a function of volume in a semi-continuous run of five columns.
Figure 7:
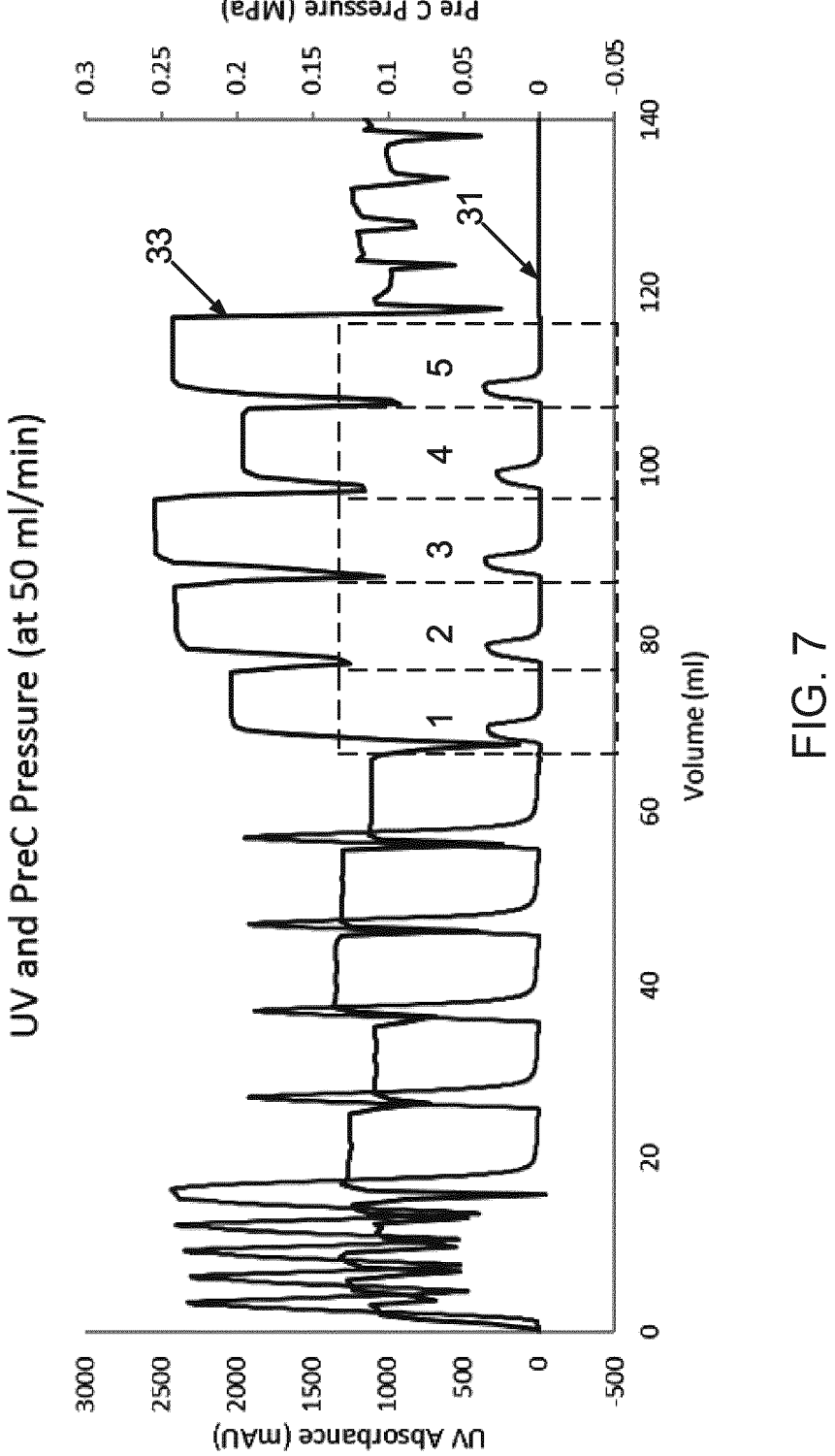

FIGS. 6 and 7 illustrate UV 31, pH 32 and pressure 33 as a function of volume in a semi-continuous run of five purifying units, each purifying unit having the same volume as the five purifying units used to illustrate the volume consumption in FIG. 4. In this example 5×250 µl purifying units were used with a 50 ml/minute flow and a total run time of 4.5 minutes. The load and wash of five purifying units requires a volume of approximately 65 ml. The elution is thereafter performed sequentially for the columns before the chromatography run is ended with a wash step to clean the system before initiating a new chromatography run.

The used volume when operating the system in a semi-continuous run as illustrated in FIGS. 6 and 7, is approximately 140 ml, which should be compared to the used volume indicated in FIG. 4 (335 ml). The volume in semi-continuous operation is reduced by almost a factor 2.4 (only 42% of the volume compared to when operating in series). Furthermore, the speed of the process is also improved, which increases the through-put/time period. An important reason for this is that the amount of standing volumes within pipes, pumps, etc. that needs to be washed out between the different phases of operation, i.e. loading and eluting, is reduced since loading is performed for all purifying units before the next phase commences and liquid is shifted.

These conclusions may be established since the purification units used in FIG. 4 are of the same volume and type as in this example. Furthermore, the same general settings have been used throughout the two runs i.e. same loading volume, same wash volume etc. and specify the volumes more in detail. Savings are gained since no washing is required when switching between the purifying units during loading, washing, eluting etc.

The concept has been illustrated in a chromatography system having five purifying units, but any system with multiple purifying units may benefit when operating "x" purifying units in series wherein each stage of the chromatography run is repeated x times. Thus in a three purifying unit set-up, the process may be:

Fill-Fill-Fill-Elute-Elute-Elute-Wash-Wash-Wash, Fill-Fill-Fill-Elute-Elute . . .

Another process may be used including a wash between the Fill and Elute:

Fill-Fill-Fill-Wash-Wash-Wash-Elute-Elute-Elute-Wash-Wash-Wash, Fill-Fill-Fill-Elute-Wash . . .

Figure 9:
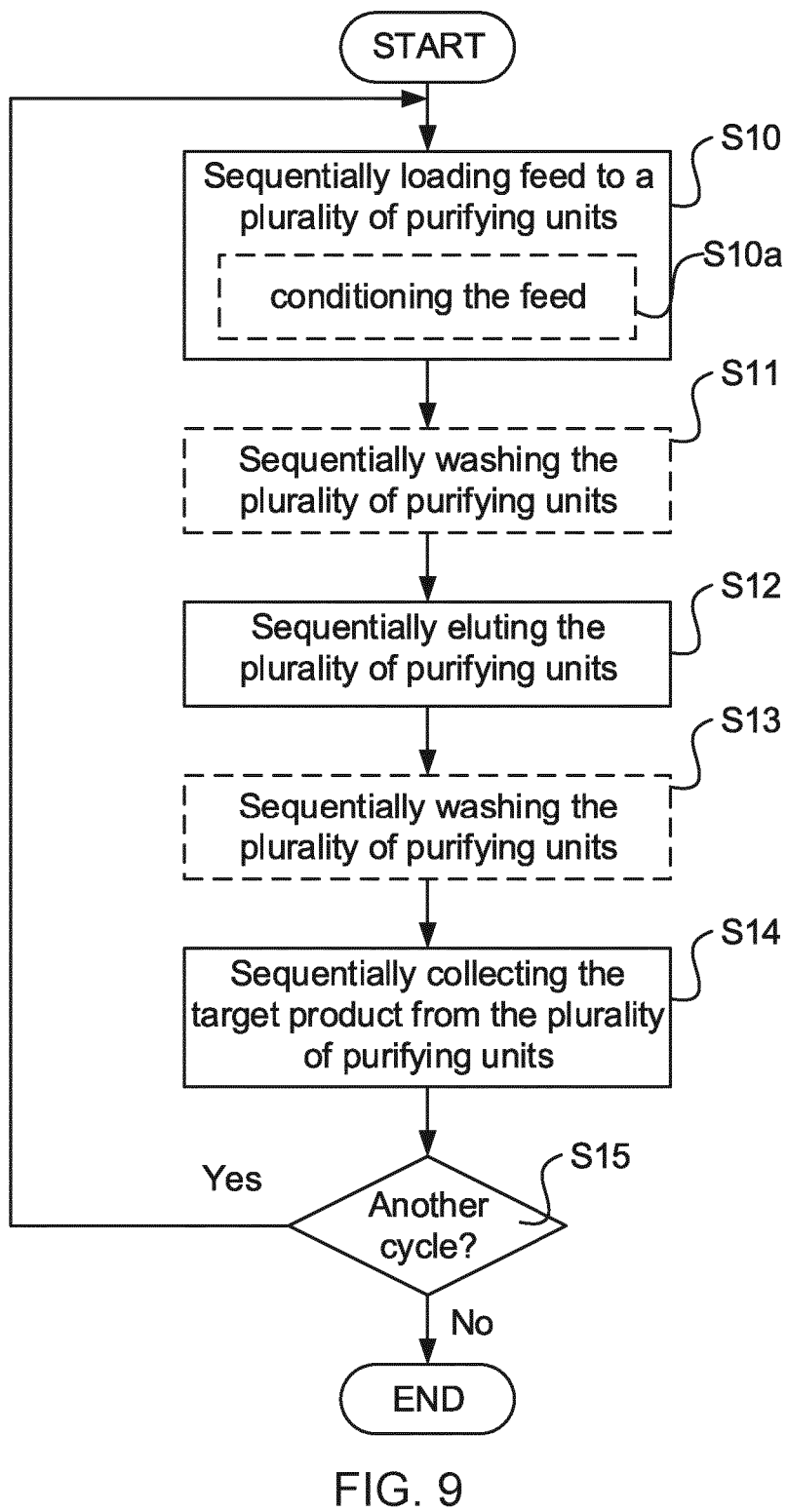
FIG. 9 is a flowchart illustrating the method for purifying a feed.

FIG. 9 is a flowchart illustrating the method for purifying a feed comprising a target product in a chromatography system having a plurality of purifying units, each purifying unit having an inlet and an outlet, and a valve having an outlet port and an inlet port. The inlet and the outlet of each purifying unit being connected to a respective port of the valve.

In step S10, the plurality of purifying units are loaded with feed provided through the inlet port of the valve assembly by sequentially connecting each purifying unit to the inlet port of the valve assembly. Thereafter follows an optional step S11 comprising, before the next step S12, washing the plurality of purifying units using a solution provided through the inlet port of the valve assembly by sequentially connecting each purifying unit to the inlet port of the valve assembly.

In step S12, when step S10 and optionally step S11 are completed, eluting the plurality of purifying units using solution to elute provided through the inlet port of the valve assembly by sequentially connecting each purifying unit to the inlet port of the valve assembly. According to some embodiments, an optional step S13 is performed when step S12 is completed, comprising washing the plurality of purifying units using a solution provided through the inlet port of the valve assembly by sequentially connecting each purifying unit to the inlet port of the valve assembly.

In step S14, the at least one target product is collected from the outlet port of the valve assembly by sequentially connecting each purifying unit to the outlet port of the valve assembly.

If the at least one target product comprises at least a first target product, and the chromatography system operates in a flow-through mode, the first target product is collected during the loading step S10. In the flow-through mode, impurities are bound to the purifying unit and the first target product flow through to the outlet port to be collected.

On the other hand if the at least one target product comprises at least a first target product, and the chromatography system operates in a bind and elute mode, the first target product is bound to the purifying unit during the loading step S10 and the first target product is collected during the eluting step S12.

In an alternative embodiment, the at least one target product comprises a first target product and a second target product and the chromatography system operates in a combined mode. This means that the first target product is collected during loading S10 when the system operates in a flow-through mode and the second target product is collected during eluting S12 when the system operates in a bind and elute mode.

It should be noted that the collecting of the at least one target product is controlled by the outlet valve 14 in FIG. 3, in order to direct the peak containing the target product for collection.

According to some embodiments, each purifying unit of the chromatography system is a membrane purifying unit, preferably with electrospun material such as cellulosic material. According to some embodiment each purifying unit is selected to be a column with chromatography resin or a membrane purifying unit.

According to some embodiment the chromatography system is further provided with a pretreatment device to the inlet of the valve, and step S10 further comprises conditioning S10a the feed before entering the inlet of the valve.

According to some embodiment the pre-treatment device is selected to be a filter or chromatography column configured to condition the feed by removing selected material, such as DNA.

According to some embodiments, steps S10-S14 are repeated if required, as illustrated by S15. The steps S10-S14 are repeated at least twenty times, and according to a more preferred embodiment repeated at least one hundred times. During each repeated cycle a part of the same feed is purified using the same purifying units, which means that the purifying units are maintained during the process run and are not replaced until the run is completed.

According to some embodiment, the purifying units are selected to be of the same type. This means of similar volume, ligand modalities, etc.

The chromatography system for purifying a feed comprising a target product having a plurality of purifying units also is provided with a control unit 45 configured to control the valve assembly 40; 48 in order to:
    a) load the plurality of purifying units with feed provided through the inlet port of the valve assembly by sequentially connecting each purifying unit to the inlet port of the valve;

b) when step a) completed, elute the plurality of purifying units using a solution to elute provided through the inlet port of the valve assembly by sequentially connecting each purifying unit to the inlet port of the valve assembly; and
    c) collect the target product from the outlet port of the valve assembly by sequentially connecting each purifying unit to the outlet port of the valve assembly.

According to some embodiments, the control unit is further configured to when step c) is completed, wash the plurality of purifying units using a solution provided through the inlet port of the valve assembly by sequentially connecting each purifying unit to the inlet port of the valve.

According to some embodiments, the control unit is further configured to, before eluting the plurality of purifying units in step b), wash the plurality of purifying units using a solution provided through the inlet port of the valve assembly by sequentially connecting each purifying unit to the inlet port of the valve assembly.

The method described in connection with FIG. 9 may be implemented in a computer program for purifying a feed comprising a target product in a chromatography system, comprising instructions which, when executed on at least one processor, cause the at least one processor to carry out the method described above. Furthermore, a computer readable storage medium may carry the computer program for purifying a feed comprising a target product.

The invention claimed is:

1. A method for purifying a feed comprising at least one target product in a chromatography system having a plurality of adsorption purifying units, each purifying unit having an inlet and an outlet, and a valve assembly comprising a single rotary valve, an outlet port, and an inlet port, wherein the inlet and the outlet of each purifying unit is connected to a respective port of the valve assembly, said method comprising:
    a) loading the plurality of purifying units with feed provided through the inlet port of the valve assembly by sequentially connecting each purifying unit to the inlet port of the valve assembly;
    b) when step a) is completed, eluting the plurality of purifying units using a solution to elute provided through the inlet port of the valve assembly by sequentially connecting each purifying unit to the inlet port of the valve assembly; and
    c) collecting the at least one target product from the outlet port of the valve assembly;
    wherein the loading step is performed for each of the plurality of purifying units, then the eluting step is performed for each of the plurality of purifying units, and then the collecting step is performed for each of the plurality of purifying units, such that the purification of the feed is a semi-continuous process;
    wherein each purifying unit of the chromatography system is a membrane adsorber; and
    wherein the plurality of purifying units are connected in parallel.

2. The method according to claim 1, wherein the membrane adsorber comprises electrospun material.

3. The method according to claim 1, wherein each purifying unit is selected to be a column comprising the membrane adsorber.

4. The method according to claim 1, wherein the chromatography system is further provided with a pretreatment device to the inlet of the valve assembly, and the method further comprises conditioning the feed before entering the inlet of the valve assembly.

5. The method according to claim 4, wherein the pre-treatment device is selected to be a filter or chromatography column configured to condition the feed by removing selected material.

6. The method according to claim 1, wherein the method further comprises when step b) is completed, washing the plurality of purifying units using a solution provided through the inlet port of the valve assembly by sequentially connecting each purifying unit to the inlet port of the valve assembly.

7. The method according to claim 1, wherein step b) further comprises, before eluting the plurality of purifying units, washing the plurality of purifying units using a solution provided through the inlet port of the valve assembly by sequentially connecting each purifying unit to the inlet port of the valve assembly.

8. The method according to claim 1, wherein steps a)-c) are repeated at least twenty times and during each repeated cycle a part of the same feed is purified using the same purifying units.

9. The method according to claim 1, wherein the purifying units are selected to be of the same type.

10. A chromatography system for purifying a feed comprising at least one target product having a plurality of purifying units, each purifying unit having an inlet and an outlet, and a valve assembly comprising a single rotary valve, an outlet port, and an inlet port, wherein the inlet and the outlet of each purifying unit being connected to a respective port of the valve assembly, said chromatography system further comprises a control unit configured to:

a) load the plurality of purifying units with feed provided through the inlet port of the valve assembly by sequentially connecting each purifying unit to the inlet port of the valve assembly;

b) when step a) completed, elute the plurality of purifying units using a solution to elute provided through the inlet port of the valve assembly by sequentially connecting each purifying unit to the inlet port of the valve assembly; and c) collect the at least one target product from the outlet port of the valve assembly;

wherein the loading step is performed for each of the plurality of purifying units, then the eluting step is performed for each of the plurality of purifying units, and then the collecting step is performed for each of the plurality of purifying units, such that the purification of the feed is a semi-continuous process;

wherein each purifying unit of the chromatography system is a membrane adsorber; and wherein the plurality of purifying units are connected in parallel.

* * * * *